United States Patent [19]
Wilkes et al.

[11] Patent Number: 5,545,860
[45] Date of Patent: Aug. 13, 1996

[54] DISCHARGE MUFFLER FOR AN AUTOMOTIVE COMPRESSOR AND METHOD FOR MAKING SAME

[75] Inventors: Eugene Wilkes, Detroit, Mich.; Alejandro Mendez, Juarez, Mexico; Bradley W. Bauer, Dearborn Heights, Mich.

[73] Assignee: Ford Motor Company, Dearborn, Mich.

[21] Appl. No.: 391,800

[22] Filed: Feb. 21, 1995

[51] Int. Cl.$^6$ .................................................. F01N 1/00
[52] U.S. Cl. ........................... 181/255; 181/282; 181/403
[58] Field of Search ................................ 181/229, 247, 181/255, 282, 403; 417/312

[56] References Cited

U.S. PATENT DOCUMENTS

| | | | |
|---|---|---|---|
| 2,074,932 | 3/1937 | Mittendorf et al. | 181/403 X |
| 2,133,875 | 10/1938 | Steenstrup . | |
| 3,827,255 | 8/1974 | Kish . | |
| 4,109,751 | 8/1978 | Kabele | 181/247 |
| 4,907,414 | 3/1990 | Fraser, Jr. et al. . | |
| 5,101,931 | 4/1992 | Blass et al. . | |
| 5,164,552 | 11/1992 | Pandeya et al. | 181/403 X |
| 5,196,654 | 3/1993 | Diflora et al. | 181/229 |

FOREIGN PATENT DOCUMENTS

| | | |
|---|---|---|
| 3-67071 | 3/1991 | Japan . |
| 6-123525 | 5/1994 | Japan . |

*Primary Examiner*—Khanh Dang
*Attorney, Agent, or Firm*—Raymond L. Coppiellie; Roger L. May

[57] ABSTRACT

A muffler (20) for attenuating fluid pressure pulsations produced by (14) in an automotive air conditioning system (10) includes a housing (22) having opposed to axial ends, an inlet opening (40) and an outlet opening (42) both disposed at the same axial end of the housing. A tube (44) extends through the inlet opening (40) and into the housing, the tube having a first portion (46) and a second portion (48), the second portion having a diameter smaller than a diameter of the first portion. A circumferential bead (50) limits the extension of the tube into the housing to a predetermined distance. A method of manufacturing such a muffler is also disclosed.

7 Claims, 2 Drawing Sheets

DISCHARGE MUFFLER FOR AN AUTOMOTIVE COMPRESSOR AND METHOD FOR MAKING SAME

BACKGROUND OF THE INVENTION

1. Field of The Invention

The present invention relates generally to an apparatus for attenuating pressure pulsations in a hydraulic system. More particularly, the present invention relates to a compressor discharge muffler for air conditioning system of an automotive vehicle which attenuates the pressure pulsations propagated from the compressor of the air conditioning system and a method of manufacturing such a muffler.

2. Disclosure Information

Automotive heating, ventilating and air conditioning systems are known to be an annoying source of noise in a vehicle's passenger compartment. There are two components in the HVAC system that generate the majority of the noise: the air conditioning compressor in the refrigeration system and the blower in the air distribution system. The air conditioning compressor can produce a variety of steady state intransient noises depending on the ambient conditions, the type of compressor: (piston, rotary or scroll), number of cylinders in the engine and the associated drive ratio, and different engine operating conditions. The majority of the objectionable noise produced by the compressor results from the acoustical wave propagation of the air conditioning refrigerant through the air conditioning hoses in the engine compartment. These pulsations are readily transmitted through the various components in the air conditioning system, such as the evaporator or accumulator to become audible in the vehicle interior.

U.S. Pat. No. 5,101,931 discloses a compressor discharge muffler including a single expansion chamber and an impedance tube for attenuating pressure pulsations extending into the chamber. The outlet tube is disposed on a cylindrical wall of the housing and the impedance tube is secured into the chamber by a fitting. Given the very limited engine compartment space of today's vehicles, this type of muffler may present a space problem since the outlet and impedance tubes are disposed on different sides of the chamber. Furthermore, the use of a fitting to secure the impedance tube in the chamber is costly and complex. Therefore, it would be desirable to provide discharge muffler which presents a more efficient package design and which reduces the cost and complexity of prior art mufflers.

SUMMARY OF THE INVENTION

The present invention solves the problems associated with the prior art by providing an apparatus for attenuating noise produced by fluid pressure pulsations in a hydraulic system of an automotive vehicle, such as an air conditioning system. The apparatus comprises a generally cylindrical housing having opposed axial ends and defining a chamber therebetween, an inlet opening and an outlet opening both disposed at the same axial end of the housing and a tube extending through the inlet opening into the chamber a predetermined distance. The tube includes a first portion fluidly connected to a fluid source, a second portion projecting through the inlet opening and into the chamber a predetermined distance and a circumferential bead formed between the first and second portions. The second portion of the tube forms a press fit relationship with the inlet opening to eliminate the need for fittings. The circumferential bead has a diameter greater than the diameter of the inlet opening and limits the distance the second tube portion extends into the chamber. The diameter of the first portion of the tube is greater than the diameter of the second portion of the tube.

There is further disclosed herein a method of making a discharge muffler which attenuates pressure pulsations produced by a compressor in an automotive air conditioning system, comprising the steps of:

a. forming a pair of cup-shaped members, each member having an open end terminating in a peripheral edge;

b. piercing an inlet opening having a circumferential lip of predetermined radius of curvature into one of the cup-shaped members, the lip projecting toward the open end of the cup-shaped member;

c. piercing an outlet opening having a circumferential lip of predetermined radius of curvature into the same cup-shaped member which includes the inlet opening, the lip projecting outward from the cup-shaped member;

d. forming an tube having a first portion and a second portion and a circumferential bead formed between the first and second portions, the diameter of the second portion being less than diameter of the first portion, and the diameter of the bead being greater than the diameter of the first portion;

e. securing the two cup-shaped members together;

f. inserting the tube through the inlet opening until the bead contacts an outer surface of the cup-shaped member;

g. securing an outlet tube to the outlet opening;

h. brazing the muffler at a predetermined temperature to sealingly connect together the two cup-shaped members and the tube and outlet tube to the housing.

These and other objects, features and advantages of the present invention will become apparent from the drawings, detailed description and claims which follow.

DETAILED DESCRIPTION OF THE PREFERRED EMBODIMENTS

Figure 1:
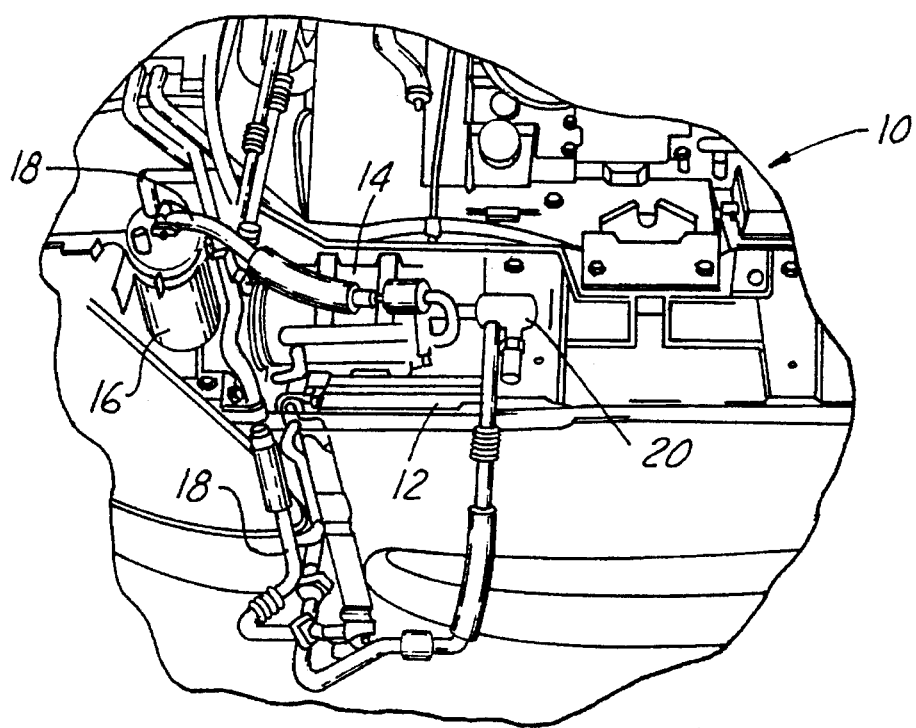
FIG. 1 is a perspective view of the major components of an automotive air conditioning system.

Referring now to the drawings, FIG. 1 shows a diagram of a typical automotive air conditioning system with its major components. The air conditioning system 10 includes a condenser assembly 12, a compressor 14, an evaporator assembly (not shown), and an accumulator 16. As is well known in the art, these components are fluidly connected by hoses 18. The details of the operation of an air conditioning system are well known to those skilled in the art and need not be explained here. As will be explained in detail below, the air conditioning system 10 includes a muffler assembly 20 for attenuating the wave pulse propagations and resultant noise from the compressor. The present invention will be explained with respect to the air conditioning system 10 of FIG. 1; however, it is not meant to be limited thereto. The present invention has application to any type of hydraulic system such as a power steering system, fuel lines and engine exhaust/intake systems.

Figure 2:
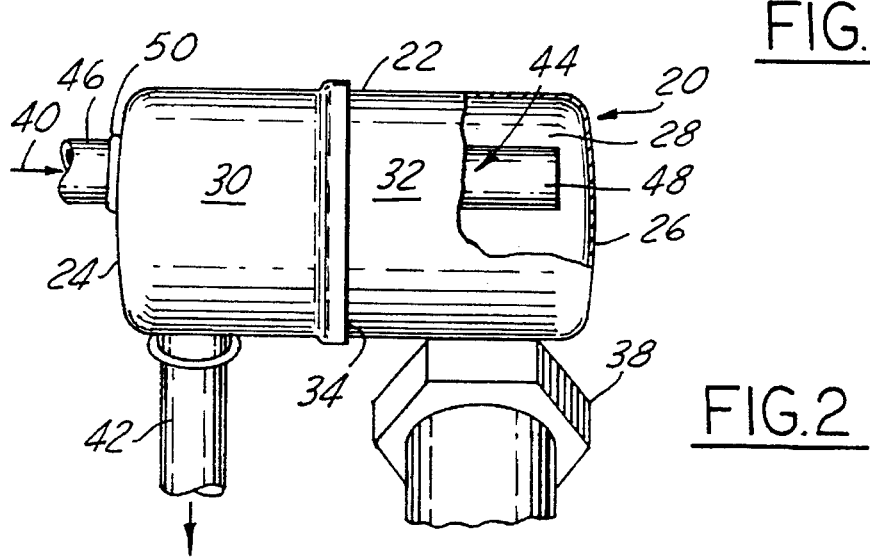
FIG. 2 is a perspective, partially cross-sectional view of a muffler structured in accord with the principles of the present invention.

Referring now to FIG. 2, the muffler 20 comprises a generally cylindrical housing 22 having a first axial end 24 and an opposed second axial end 26 which defines a chamber 28 therebetween. The housing is formed from two cup-shaped members 30, 32 each having an open end defining a peripheral edge 34, 35, respectively. As will be described in greater detail below, the peripheral edges 34, 35 are connected together in a sealed relationship during the manufacture of the muffler.

The muffler 20 further includes an inlet opening 40 and an outlet opening 42, both disposed at the same axial end 24 of the housing 22. A tube 44 extends through the inlet opening 40 of the housing 22 and includes a first portion 46 connected to a fluid source, such as the automotive compressor 14, and a second portion 48 terminating within the chamber 28. The tube 44 attenuates the pressure pulsations emanating from the compressor and has a length determined by calculations known to those skilled in the art. A circumferential bead 50 is formed between the first portion 46 and the second portion 48 of the tube 44. The bead 50 acts to limit the distance the tube 44 extends into the chamber 28 so that the terminating end of the second portion 48 of the tube does not contact the second axial end 26 of the housing 22. In this manner, the bead 50 is a limiting member which prevents the contact of the second portion 48 of the tube 44 and the end wall 26. The housing 22 further includes an outlet opening 42 through which the vapor/liquid passes from the compressor into the next stage of the air conditioning cycle. As shown in FIG. 2, the muffler may also include a high pressure limit switch 38. The limit switch 38 is a sensor electrically connected to the compressor such that when the pressure pulsations within the chamber exceed a predetermined limit, the switch 38 sends a signal to the compressor discontinuing its operation. In this manner, the compressor can be shut off before irreparable damage is done to it due to high pressure.

Figure 3A:
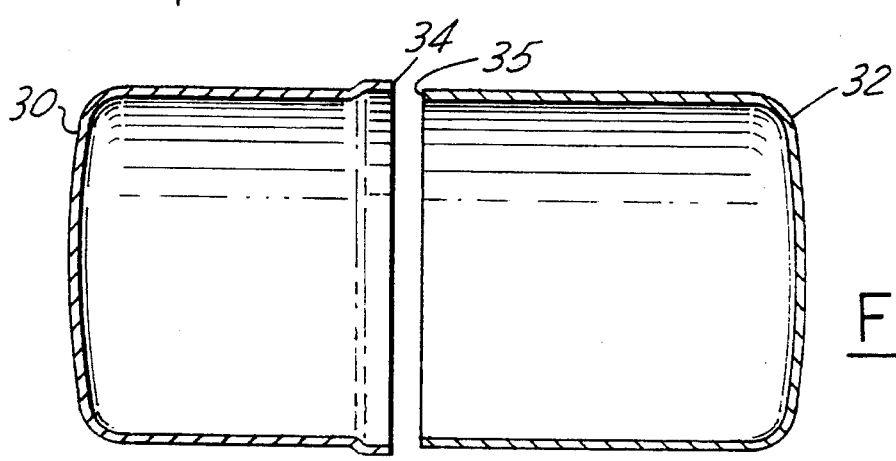
FIGS. 3A–3E illustrate the steps in a method of manufacturing a muffler in accordance with the principles of the present invention.
Figure 3B:
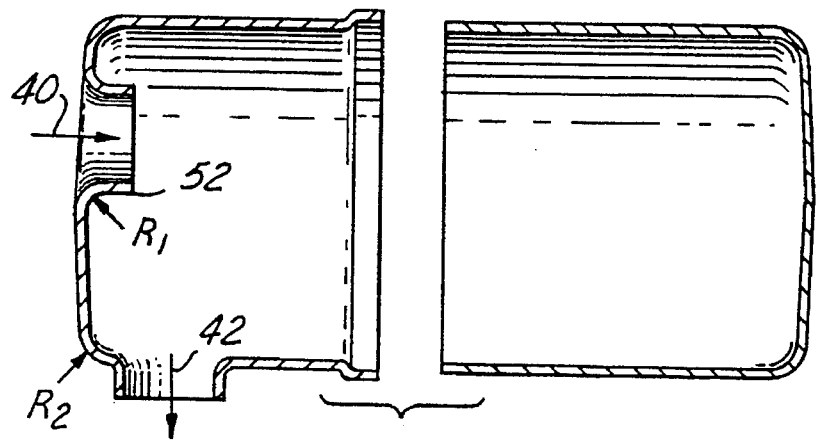

FIGS. 3A–E show the steps in the manufacture of the compressor discharge muffler according to the present invention. The first step in the manufacture of the muffler 20 of the present invention is to form the first 30 and second 32 cup-shaped members which when sealed together form the generally cylindrical housing 22 of the muffler 20. Typically, these cup-shaped members 30, 32 are formed from steel using a deep drawing process. Each of the cup-shaped members has a peripheral edge 34, 35 at its opening such that when the cup-shaped members are fit together, the terminating ends can either overlap or abut and be welded or brazed thereat. FIG. 3B shows the second step in the manufacture process in which the inlet opening 40 and the outlet opening 42 are formed in one of the cup-shaped members 30. The inlet opening and outlet openings are formed using a piercing operation. The inlet opening is formed with an inward pierce such that a peripheral lip 52 extends inwardly toward the interior chamber 28 of the housing. The peripheral lip 52 has a predetermined radius $R_1$ and is of a diameter such that a press fit relationship is formed between the peripheral lip 52 and the second portion 48 of the tube 44. Similarly, the outlet opening 42 is formed in a piercing operation such that a peripheral lip 53 is formed which extends outward from the outer surface of the cup-shaped member 30. The peripheral lip 53 also includes a predetermined radius, $R_2$.

Figure 3C:
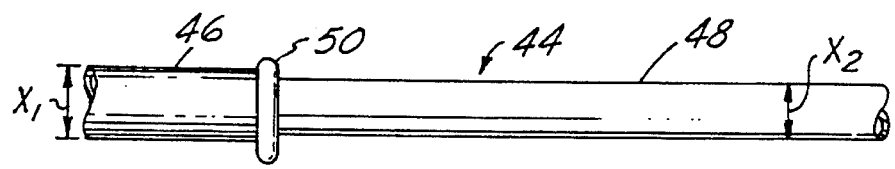
Figure 3D:
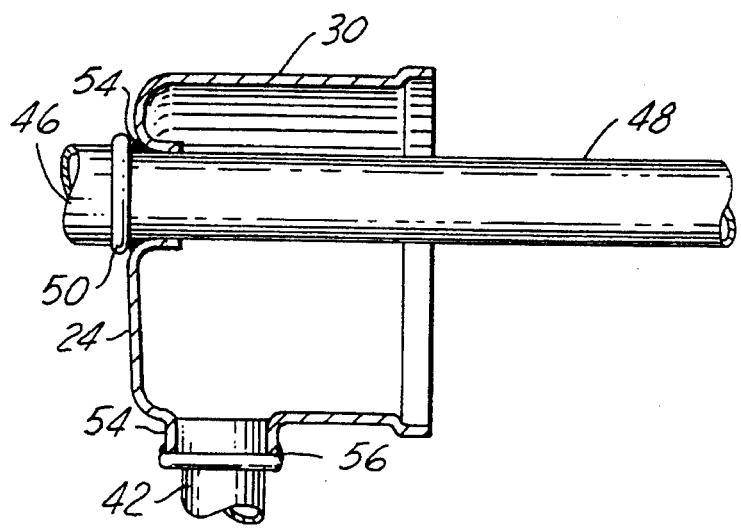

FIG. 3C shows the formation of the tube 44 utilized in the muffler of the present invention. As shown in FIG. 3C, the first portion of the tube 46 has a diameter, $X_1$, greater than the diameter of the second portion 48 of the tube 44, $X_2$. The circumferential bead 50 has a diameter greater than the diameter of the first portion, $X_1$. The tube 44 is formed through a swaging process through which the second portion is formed having the smaller diameter than the first portion. This is critical in that by having the second portion with a diameter $X_2$ approximately equal to the diameter of the inlet opening, a press fit relationship is formed when the tube 44 is inserted through the inlet opening until the circumferential bead 50 contacts the axial end 24 of the cup-shaped member as is shown in FIG. 3D. In this manner, the circumferential lip 52 is not deformed during the insertion process as was found to happen during the fabrication of prior art muffler assemblies wherein the diameter of the tube 44 was a constant diameter throughout its length. As shown in FIG. 3D, the tube 44 is inserted through the inlet opening 40 until the circumferential bead 50 contacts the first axial end 24 of the cup-shaped member 30. By having a predetermined radius $R_1$ on the circumferential lip, a brazing material 54 flows through capillary action alongside the outer surface of the second portion 48 of the tube 44 to effectively seal the inlet opening. At the same time, an outlet tube 43 is inserted into the outlet opening 42. The outlet tube 43 also includes a circumferential bead which contacts the lip 54 of the outlet opening 42. By utilizing an outlet opening having a peripheral lip 54 extending outwardly from the external surface of the cup member 30, better drainage is achieved within the chamber 28 of the housing 22.

Figure 3E:
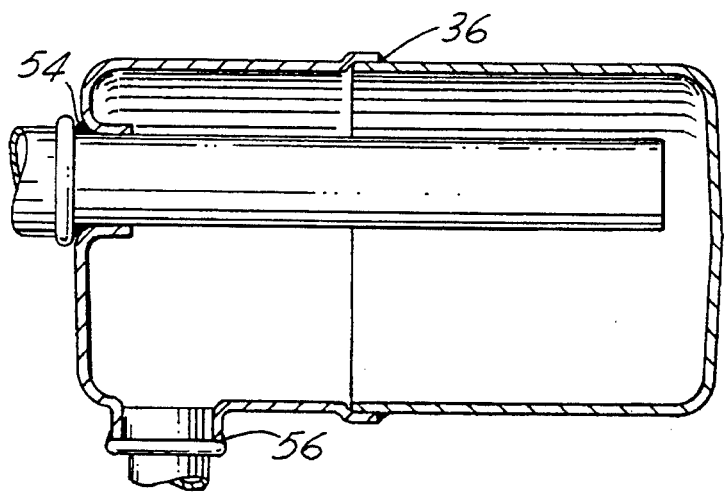

The last stage in the manufacturing process is shown in FIG. 3E wherein the components are all press fit together and subjected to a brazing operation at a predetermined temperature for a predetermined amount of time as determined by the materials used to manufacture the muffler assembly 20. In the presently preferred embodiment, the housing 22 and inlet and outlet tubes are manufactured from steel. The presently preferred embodiment provides advantages over the prior art by allowing for versatile packaging since the inlet and outlet tubes are on the same axial end of the muffler housing 22 and the manufacturing results in less waste because of the different diameters of the tube 44.

Various other modifications and alterations of the presently preferred embodiment will, no doubt, occur to those skilled in the art. For example, the circumferential bead can be eliminated and the distance the tube is inserted can be limited by an assembly machine. It is the following claims, including all equivalents which define the scope of the invention.

What is claimed is:

1. An apparatus for attenuating noise produced by fluid pressure pulsations in a hydraulic system of an automotive vehicle, comprising:

a generally cylindrical housing having opposed axial ends and defining a chamber therebetween;

an inlet opening and an outlet opening both disposed at the same axial end of the housing; and a tube extending through the inlet opening into the chamber a predetermined distance, said tube having a first portion fluidly connected to a fluid source, a second portion projecting through said inlet opening and into said chamber a predetermined distance and a circumferential bead formed between said first and second portions, said second portion being configured to form a press fit relationship with said inlet opening, said circumferential bead having a diameter greater than the diameter of said inlet opening, said circumferential bead being configured to limit the distance said second tube portion extends into said chamber and wherein the diameter of said first portion of said tube is greater than the diameter of said second portion of said tube.

2. An apparatus according to claim 1, wherein said inlet opening includes a circumferential lip having a predetermined radius of curvature projecting into said chamber a predetermined distance.

3. An apparatus according to claim 2, wherein said outlet opening includes a circumferential lip having a predetermined radius of curvature projecting outwardly from said housing.

4. An apparatus according to claim 1, further including a high pressure limit switch electrically connected to said fluid source, said switch being operative to limit the operation of said fluid source when pressure in said chamber exceeds a predetermined threshold.

5. An apparatus according to claim 1, wherein said housing comprises two cup-shaped members each having an open end defining a peripheral edge, said peripheral edges being configured to be connected together in a sealed relationship.

6. An apparatus according to claim 5, wherein said cup-shaped members are manufactured from a steel alloy.

7. A muffler for attenuating fluid pressure pulsations produced by a compressor in an automotive air conditioning system, comprising:

a generally cylindrical housing having opposed axial ends and defining an chamber therebetween, said housing comprising two cup-shaped members each having an open end defining a peripheral edge, said peripheral edges being configured to be connected together in a sealed relationship;

an inlet opening and an outlet opening both disposed at the same axial end of said housing, said inlet opening including a circumferential lip having a predetermined radius of curvature projecting into said chamber a predetermined distance, said outlet opening including a circumferential lip having a predetermined radius of curvature projecting outwardly from said housing;

a tube extending through said inlet opening into said chamber a predetermined distance, said tube having a first portion fluidly connected to a fluid source, a second portion projecting through said inlet opening and terminating in said chamber and a circumferential bead formed between said first and second portions, said bead having a diameter greater than the diameter of said inlet opening and being configured to limit the distance said second tube portion extends into said chamber, said second portion being configured to form a press fie relationship with said inlet opening, and wherein the diameter of said first portion of said tube is greater than the diameter of said second portion of said tube.

* * * * *